Nov. 19, 1929.    P. H. CRAGO ET AL    1,735,954
RAILWAY SWITCHING DEVICE
Filed June 30, 1924
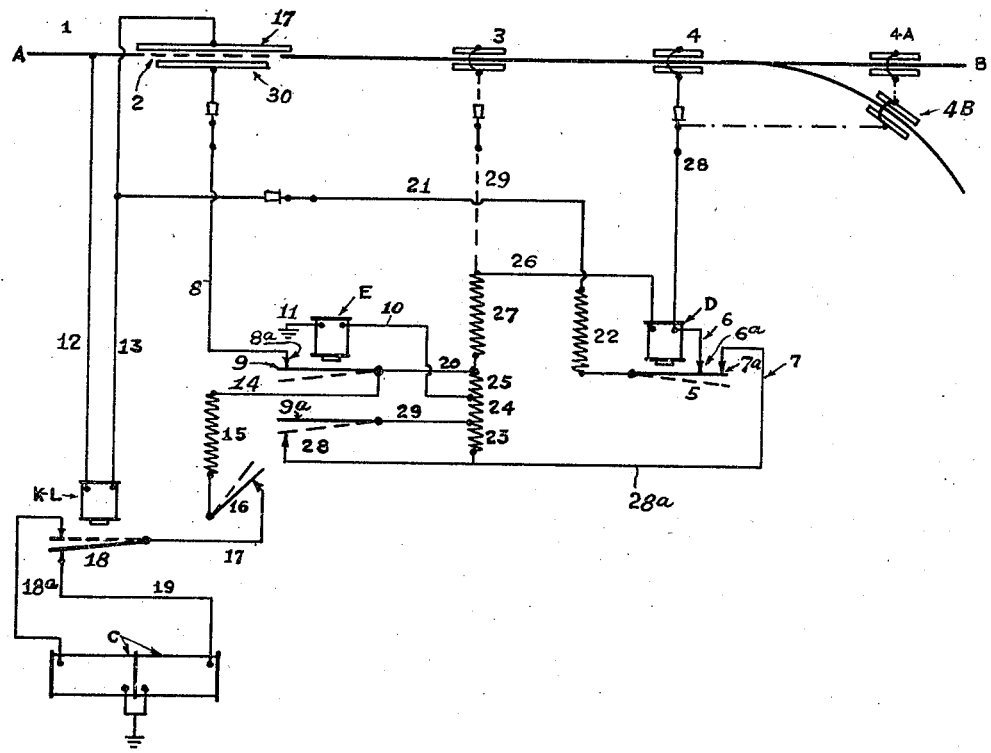
INVENTORS
PAUL H. CRAGO
GEO. D. RABUN
BY John L. Milton
ATTORNEYS.

Patented Nov. 19, 1929

1,735,954

UNITED STATES PATENT OFFICE

PAUL H. CRAGO AND GEORGE D. RABUN, OF LOUISVILLE, KENTUCKY, ASSIGNORS TO CHEATHAM ELECTRIC SWITCHING DEVICE COMPANY, OF LOUISVILLE, KENTUCKY

RAILWAY SWITCHING DEVICE

Application filed June 30, 1924. Serial No. 723,361.

This invention relates to electrically operated and controlled railway switching devices and controls therefor. This device is of particular use where several cars follow each other very closely over an electrically operated track switch to eliminate the danger of having some of the wheels of the train or of a given car switch in one direction and some in another; or of having the track switch move between wheels of a preceding car, due to the premature operation of the track switch by a following car.

The object of our invention is to provide a highly efficient and reliable safety switching control device, a new feature residing in the fact that we have so arranged our cooperating parts and circuits that the untimely and accidental opening of any circuit or connection will cause the entire device to be thrown to a safety and inoperative condition so as to prevent the next coming car from operating the track switch.

A new feature for insuring positive and reliable operation resides in the fact that we provide means for "locking" and controlling the track switch simultaneously with the operation of same. The entire control device is normally energized. A marked advantage that this system has over any other known to us resides in the fact that both major elements of the lock are normally energized and so disposed that even should the power leave the line the apparatus will fall to safety.

For a more particular description of our invention reference is to be had to the drawing herewith in which:

The figure is a diagrammatic view of a preferred employment of our invention.

In the figure we have shown not only our safety switching control device but the trolley wire and the major parts of the control of a switching device, such as is commercially used for operating track switches. Relays E and D of the device are normally energized, being kept in the normally energized position by circuits as follows:

Relay E has a circuit from trolley thru wire 12, low resistance relay K—L, wire 13, wire 21, resistor 22, armature 5 of relay D, front contact 7ª of relay D, wire 7, resistors 23, 24, wire 10, solenoid E, wire 11 to ground. Relay D has a circuit from trolley thru wire 12, low resistance relay K—L, wire 13, wire 21, resistor 22, armature 5 of relay D, front contact 6ª of relay D, wire 6, solenoid of relay D, to wire 26, to resistor 27, wire 20, wire 14, resistor 15, switch 16, armature 18 and back contact 18ª of relay K—L, wire 19, track switch operating solenoid C, to ground, energizing D sufficiently to hold it in the energized position but not energizing C sufficiently to cause operation of the track switch.

As the trolley wheel approaching from the A end of the trolley wire (as shown in the figure) makes contact with strips of contactor 2 current is fed from trolley thru wire 12, low resistance relay K—L, wire 13, long strip 17 of contactor 2, across trolley wheel to strip 30 of contactor 2, wire 8, front contact 8ª and armature 9 of relay E, wire 14, resistor 15, switch 16, armature 18 of relay K—L, to back contact 18ª, wire 19, to one track switch operating solenoid C and thence to ground, energizing solenoid C and thus operating track switch. Since trolley voltage is thus applied to wires 14 and 20, relay D is shunted out, since it has trolley voltage of equal potential applied to each terminal of its solenoid. It therefore drops to the deenergized position, opening front contact 6ª and 7ª of its armature 5. Since relay E was fed thru contact 7ª as above described, that feed is now open, but the application of trolley voltage to wires 14 and 20 has provided a new feed for E from trolley to 20 as described above and thence thru resistor 25, wire 10, solenoid E and wire 11 to ground. Thus while trolley wheel is traversing contactor, relay D is shunted out and relay E is held up by the circuit last described. Upon the trolley wheel leaving the contactor trolley voltage is removed from wire 14 and 20. Thus the additional feed for solenoid E is removed, permitting armatures 9 and 9A of relay E to drop, opening circuit from strip 30 of contactor 2, thru wire 8, front contacts 8ª and armature 9 of relay E, wire 14, resistor 15, switch 16, wire 17, armature 18 and back contact 18ª of relay K—L, wire 19, solenoid C to ground, which is the circuit necessary for operation of the track switch.

This prevents operation of the switch by any following car.

A contactor 4 is provided to restore the relays to their normal or energized position after the wheels of a car have passed the track switch so that the track switch may be operated by a following car. This is accomplished as follows: As the trolley wheel traveling toward B makes contact with the strips of contactor 4, it feeds current from trolley thru wire 28, solenoid D, wire 26, resistor 27 and wires 20 and 14, and continuing thru the normal energizing circuit for D as above described, energizing D and causing its armatures 5 to rise. This completes the circuits for the normal energization of D and E from trolley thru 12, low resistance relay K—L, wires 13, 21, resistor 22, armature 5 to contacts $6^a$ and $7^a$. The current here divides, part passing thru wires 7 and $28^a$ to back contact 28 of armature 9—A, resistor 24, wire 10, solenoid E, wire 11 to ground, energizing solenoid E, and causing armatures 9 and 9—A to be restored to their normal energized position. As armature 9—A rises it opens back contact 28 of armature 9—A, thus introducing resistor 23 in the circuit and thereby reducing the blow when the armature completes its stroke. As the trolley wheel leaves the contactor the feed from armature 5 thru contact $6^a$ to solenoid D becomes effective, providing a stick circuit for D as above described.

In certain unusual conditions such as that produced by one car passing unlocking contactor 4 after a following car has proceeded past contactor 2, it would be possible for the first car passing under contractor 4 to unlock the switch, leaving the second car between the operating contactor and the switch, unprotected against a possible third car. To provide protection in such a case the additional locking contactor 3 is located at such a point that the car will lock the switch immediately before passing the switch point if the switch has been unlocked as described above. This is accomplished by the trolley wheel in making contact with the strips of the contactor 3 applying trolley potential thru wires 29, and 26 to solenoid D, thus shunting it out, breaking the stick circuits of D and E, preventing operation of the track switch and this prevents its operation by a third following car as above mentioned. Thus the following cars will each find the switch operating circuit open or inactive at contact $8^a$, due to individual locking at contactor 3 and the switch therefore inoperative. The proper placing of locking contactor 3 will therefore cause each trolley wheel to lock the switch protectively against action of any other trolley wheel, in train or singly; and hold the switch locked until the following trolley wheel of the train has passed contact strips of unlocking contactor 4, or until the single car has cleared the switch. The additional locking contactor 3 is located with reference to the various lengths of cars in use and in some cases is not needed. Unlocking contactor 4 is replaced by the two unlocking contactors 4A and 4B when trail cars are used.

Attention is called to the fact that the armatures of both relays are held up normally. Therefore the failure of any circuit will cause armature 9 controlling the switch circuit, to be dropped, thereby locking the switch.

A great many combinations of this broad idea are possible and practical and we do not wish to limit ourselves to the specific arrangement shown herein or to any specific type of switch-throwing apparatus other than by the scope of claims which we give herewith.

We claim:

1. A switch operating system comprising in combination a switch point, a trolley wire, contactor pans provided with contact members to be engaged by a current collector, a solenoid track switch operating mechanism to move the switch, control relays and circuits therefor, a track switch control comprising two normally closed circuits including the windings of the control relays, one depending on the other, energized from the trolley wire and controlling the track switch operating circuits, said operating circuits being also adapted to be selected and controlled by a car, and simultaneous with such control, is effected an opening of one of the normally closed circuits and a closure of an additional circuit which prevents the other normally closed circuit from being effected by the opening of the first normally closed circuit.

2. In an electric switch operating system, the combination with the track solenoid, trolley conductor and trolley contactor, of a normally open circuit connecting the trolley conductor and track solenoid, a normally closed switch included in the said circuit, of means controlled by contact of a trolley with a trolley contactor to retain the said switch in its normal state during the engagement of the trolley and trolley contactor, and release it upon dis-engagement of the trolley and trolley contactor.

3. In an electric switch operating system, the combination with the track solenoid, trolley conductor and trolley contactor, of a normally open circuit connecting the trolley conductor and track solenoid, of a normally closed switch included in the said circuit, a separate circuit including a normally energized relay controlling the said normally closed switch, of means controlled by contact of a trolley and trolley contactor, to release the said switch only upon dis-engagement of the trolley and trolley contactor.

4. In an electric switch operating system, the combination with the track solenoid, trolley conductor and trolley contactor, of a normally open circuit connecting the trolley conductor and track solenoid, a separate circuit including a normally energized relay controlling the said normally open circuit, remote means operable upon dis-engagement of the trolley and trolley contactor to open the said normally open circuit and retain it open until a car passes a pre-determined restoring point.

5. In an electric switch operating system, the combination with the track solenoid, trolley conductor and trolley contactor, of a normally open circuit connecting the trolley conductor and track solenoid, of means controlled by contact of a trolley with a trolley contactor for closing the said normal open circuit, and cause operation of the track switching device, and means simultaneous operative with this operation to render the said normal open circuit in-operative upon dis-engagement of the trolley contact and trolley contactor.

6. In an electric switch operating system, the combination with the track solenoid, trolley conductor and trolley contactor, of a normally open switch operating circuit connecting the trolley conductor and track solenoid, of means controlled by contact of a trolley with a trolley contactor for closing the said switch operating circuit, and means simultaneous operative with this operation to render the said switch operating circuit inoperative upon dis-engagement of the trolley contact and trolley contactor, and retain the said circuit in-operative until the trolley car has passed a pre-determined restoring point.

7. In an electric switch operating system, the combination with the track solenoid, trolley conductor and trolley contactor, of a normally open switch operating circuit connecting the trolley conductor and track solenoid, a second trolley contactor not included in the said switch operating circuit, of means controlled by contact of a trolley with this contactor to render the said switch operating circuit in-operative by a following car if the preceding car has passed the pre-determined point where the switch operating circuit is returned to normal.

8. In an electric switch operating system, the combination with the track solenoid, trolley conductor and trolley contactor, of a normally open switch operating circuit connecting the trolley conductor and track solenoid, a current collector to engage the trolley contactor, of means controlled by contact of the current collector and trolley contactor for retaining the said normal open switch operating circuit operative while engaged and render it in-operative upon dis-engagement of the current collector and trolley contactor regardless of the position of the current collector prior to the restoring point.

9. In an electric switch operating system, the combination with the track solenoid, trolley conductor and trolley contactor, of a normally open switch operating circuit connecting the troller conductor and track solenoid, a current collector to engage the trolley contactor, of means controlled by contact of the current collector and trolley contactor for retaining the said normally open switch operating circuit operative while engaged and simultaneously apply a shunt circuit as a controlling means to render the said retaining means inoperative until the trolley car had passed a pre-determined restoring point.

10. In an electric switch operating system, the combination with the track solenoid, trolley conductor and trolley contactor, of a normally open switch operating circuit connecting the trolley conductor and track solenoid, of means applied to an electric switch operating system to obtain the full time of the total actual contact engagement with the trolley contactor to control said switch operating circuit and means that would prevent the switch operating circuit being operative upon disengagement of the trolley and trolley contactor until the trolley car had passed the pre-determined restoring point.

11. In an electric switch operating system, the combination with the track solenoid, trolley conductor and trolley contactor, of a normally open switch operating circuit connecting the trolley conductor and track solenoid, means to control a relay not in circuit with the trolley contactor, which renders the switch operating circuit in-operative, upon dis-engagement of the trolley contact and trolley contactor, and retain it in-operative until the said trolley car had passed a restoring point.

GEO. D. RABUN.
P. H. CRAGO.